US009314809B2

(12) United States Patent
Johnson

(10) Patent No.: US 9,314,809 B2
(45) Date of Patent: Apr. 19, 2016

(54) RECAPTURE SPRAYER

(71) Applicant: Richard C Johnson, Meridian, ID (US)

(72) Inventor: Richard C Johnson, Meridian, ID (US)

(73) Assignee: Richard Johnson, Meridian, ID (US)

( * ) Notice: Subject to any disclaimer, the term of this patent is extended or adjusted under 35 U.S.C. 154(b) by 596 days.

(21) Appl. No.: 13/714,372

(22) Filed: Dec. 13, 2012

(65) Prior Publication Data

US 2013/0146678 A1 Jun. 13, 2013

Related U.S. Application Data

(60) Provisional application No. 61/630,469, filed on Dec. 13, 2011.

(51) Int. Cl.

*B05B 15/04* (2006.01)
*A01M 7/00* (2006.01)
*B05B 7/00* (2006.01)

(52) U.S. Cl.
CPC .......... *B05B 15/0431* (2013.01); *A01M 7/0014* (2013.01); *B05B 7/0075* (2013.01)

(58) Field of Classification Search
CPC ............ B05B 15/0437; B05B 15/0431; B05B 15/0406; B05B 15/04; B05B 7/0075; A01M 7/0014; A01M 7/0064
USPC ............ 239/77, 20, 124, 8, 261, 291, 151, 78
See application file for complete search history.

(56) References Cited

U.S. PATENT DOCUMENTS 2,608,441 A * 8/1952 Daugherty .......... A01M 7/0014 239/590.5
2,609,635 A * 9/1952 Daugherty ........... A01M 9/003 239/593
2,618,508 A * 11/1952 Daugherty .......... A01M 7/0014 239/590.5
2,667,717 A * 2/1954 Daugherty .......... A01M 7/0014 239/423

(Continued)

FOREIGN PATENT DOCUMENTS

EP 0361070 A 4/1990
EP 0549058 A 6/1993

(Continued)

OTHER PUBLICATIONS

International Search Report and Written Opinion of the International Searching Authority, issued Feb. 26, 2013 in International Application No. PCT/US2012/069596.

(Continued)

*Primary Examiner* — Arthur O Hall
*Assistant Examiner* — Viet Le
(74) *Attorney, Agent, or Firm* — Hawley Troxell Ennis & Hawley LLP; Philip McKay

(57) ABSTRACT

The present disclosure relates to a system and method for spraying one or more target objects. A primary blower system is adapted to create a relatively isolated field of circulating air by creating a primary air stream around the field of circulating air. A secondary blower system is adapted to circulate air within the isolated field by flowing a secondary air stream in directions contrary to the primary air stream. A chemical spray comprising liquid, aerosol droplets, particulate matter, or the like may be emitted into the circulating air within the field and thereby deposited on target objects within the field. Embodiments of the present disclosure may be used for agricultural, automotive, aerospace, and other applications to emit, contain, and/or recapture a spray.

18 Claims, 5 Drawing Sheets

(56) References Cited

U.S. PATENT DOCUMENTS

Figure 1:
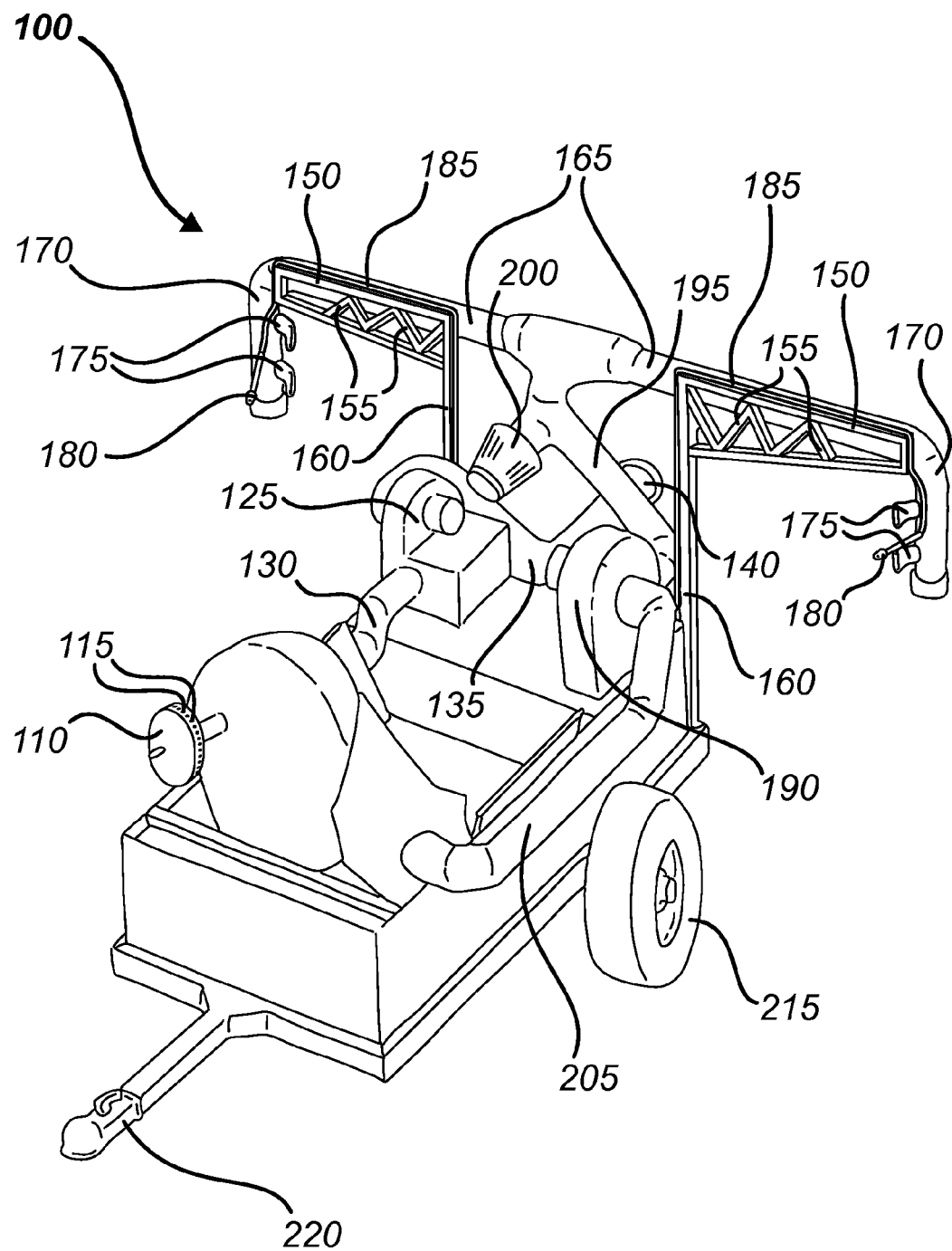

| | | | |
|---|---|---|---|
| 2,686,990 A * | 8/1954 | Matthews | A01M 7/0014 239/77 |
| 2,750,708 A * | 6/1956 | Handfield | A01M 7/0014 239/214.15 |
| 4,134,548 A | 1/1979 | Harmony | |
| 4,893,755 A | 1/1990 | Keathley | |
| 5,028,002 A | 7/1991 | Whitford | |
| 5,323,623 A | 6/1994 | Carns et al. | |
| 5,730,806 A | 3/1998 | Caimi et al. | |
| 6,302,332 B1 | 10/2001 | Panneton et al. | |
| 7,143,963 B2 | 12/2006 | Tani et al. | |
| 2005/0199842 A1 | 9/2005 | Parsons et al. | |
| 2009/0134237 A1 | 5/2009 | Giles | |
| 2013/0146676 A1 | 6/2013 | Johnson | |

FOREIGN PATENT DOCUMENTS

| | | |
|---|---|---|
| EP | 0580247 A | 1/1994 |
| EP | 2 689 662 | 1/2014 |
| JP | 02122854 | 5/1990 |
| WO | WO 01 01771 | 1/2001 |

OTHER PUBLICATIONS

International Search Report and Written Opinion of the International Searching Authority, issued Mar. 13, 2013 in International Application No. PCT/US2012/69594.

* cited by examiner

RECAPTURE SPRAYER

CROSS-REFERENCE TO RELATED APPLICATIONS

This application claims priority under 35 USC §119 to U.S. Provisional Patent Application Ser. No. 61/630,469, filed on Dec. 13, 2011, and titled "Non-Mechanical Method for Orchard Spray Recapture," the entire contents of which are hereby incorporated by reference.

TECHNICAL FIELD

The present disclosure relates generally to a spray recapture system and method. More particularly, the disclosure relates to a system and method for spraying, containing, recirculating, and recapturing a spray discharge.

BACKGROUND

Spray recapture systems have been used in the past to prevent overspray of paint, agricultural chemicals including fertilizers, fungicides, herbicides, and pesticides, and other types of spray discharge intended for one or more target objects. Such sprays may be harmful to environs surrounding the target objects. Thus, it may be desirable to mitigate dispersal of such chemicals. In some cases, spray containment shells are used to contain overspray. However, very large target objects, such as a fully mature tree or an airplane, may be too large to fit within a practically-sized spray containment shell.

What is needed, therefore, is a method and system for mitigating overspray while enhancing spray coverage on a target object and increasing spray recapture.

SUMMARY

In one embodiment, a method of spraying a target object is disclosed. The method includes creating a first flow of air around a target space, creating a second flow of air within the target space, wherein the second flow of air flows counter to the first flow of air, locating a target object within the target space, and emitting a spray within the target space.

In another embodiment, an apparatus for spraying a target object is disclosed. The apparatus includes a primary blower adapted to direct a first flow of air through multiple radially-distributed air vents, a secondary blower, and a spray nozzle. The radially-distributed air vents are adapted to direct the first flow of air in a first direction. The secondary blower is adapted to direct a second flow of air in a second direction. The second direction is approximately opposed to the first direction. The spray nozzle is adapted to emit a spray into the second flow of air.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the disclosure to those skilled in the art.

BRIEF DESCRIPTION OF THE DRAWINGS

This disclosure may be understood by reference to the following description taken in conjunction with the accompanying drawings, in which like reference numerals identify like elements, and in which:

FIG. 1 is a perspective view of a recapture sprayer according to an embodiment of the present disclosure;

FIG. 2 is a side view of a recapture sprayer according to an embodiment;

FIG. 3 is a front view of a recapture sprayer according to an embodiment;

FIG. 4 is an isometric top view of a recapture sprayer according to an embodiment; and FIG. 5 is a perspective view of a recapture sprayer in use.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed, and it is to be understood that modifications to the various disclosed embodiments may be made, and other embodiments may be utilized, without departing from the spirit and scope of the present disclosure. The following detailed description is, therefore, not to be taken in a limiting sense.

An objective of embodiments of the present disclosure is to apply a spray to a target object within a field of circulating air and recapture some of the spray while minimizing overspray, spill, and loss. Embodiments of the present disclosure comprise a powered or unpowered vehicle having spray nozzles, air pressure nozzles, and air inlet ports.

With reference to FIG. 1, an embodiment of the present disclosure comprises vehicle 100. In an embodiment, vehicle 100 comprises a non-self-propelled vehicle adapted for towing behind a tractor or similar self-propelled vehicle. In alternative embodiments, vehicle 100 comprises a self-propelled vehicle. Vehicle 100 may be adapted for use in orchards, fields, on-road, or other various environments.

Embodiments of the present disclosure comprise nose member 110. Nose member 110 comprises multiple radially-distributed air vents 115. Generally, air vents 115 comprise pass-through holes in nose member 110 in communication with an inner volume of nose member 110, which comprises a plenum. Air vents 115 are targeted at multiple radially-distributed directions roughly perpendicular to a direction of travel of vehicle 100. In alternative embodiments, air vents 115 are directed at points behind nose member 110, such that an emitted flow of air may be directed at various outward and rearward angles relative to vehicle 100. The embodiment depicted in FIG. 1 comprises approximately forty air vents 115 distributed roughly evenly around nose member 110. Alternative embodiments may comprise other numbers of air vents 115 while still falling under the scope of the present disclosure. Plenum of nose member 110 is in fluid communication with an output port of primary blower 125 via primary blower outlet duct 130. Primary blower inlet duct 135 is attached at an inlet port of primary blower 125 and comprises primary air intake vent 140 located at the rear of vehicle 100. Primary air intake vent 140 comprises vent filter 145. In embodiments of the present disclosure, a dust recapture system (not depicted) may be located within primary air intake vent 140 or primary blower inlet duct 135.

The embodiment depicted in FIG. 1 further comprises side support beams 150. Side support beams 150 comprise trestle members 155. Near the rear of vehicle 100, stanchions 160 support side support beams 150 and anchor side support beams 150 to vehicle 100. Side support beams 150 support secondary air pipes 165, which extend laterally beyond each side of vehicle 100. In alternative embodiments, side support beams 150 are integrated with secondary air pipes 165. For example, in an embodiment, side support beams 150 comprise a steel tube through which a flow of air may be carried. Secondary air pipes 165 comprise downturn pipes 170 at their lateral extremities, upon which secondary side vents 175 are attached. In the embodiment depicted in FIG. 1, spray nozzles 180 are also attached on downturn pipes 170 and are connected to spray hose 185, which provides fluid communication to a storage tank (not depicted). In an embodiment, the storage tank comprises an atomizer or other apparatus to convert liquid within the tank to an aerosol prior to transmitting the aerosol in a fluid stream through spray hose 185. The storage tank may be installed on vehicle 100 or on a tow vehicle.

Secondary air pipes 165 are in fluid communication with an output port of secondary blower 190 via secondary blower outlet duct 195. Secondary central vent 200 is also in communication with secondary blower outlet duct 195. Secondary central vent 200 comprises a large nozzle having internal vanes adapted to create cyclonic air movement on a flow of air passing therethrough. Secondary blower inlet duct 205 is attached at an inlet port of secondary blower 190 and comprises fluid communication to secondary air intake vent 210 located behind nose member 110 near the front of vehicle 100. In embodiments of the present disclosure, a filtration system (not depicted) may be located within secondary air intake vent 210 or secondary blower inlet duct 205.

Alternative embodiments comprise additional spray nozzles 180 located at or near secondary air intake vent 210 and/or secondary central vent 200. In alternative embodiments, functions served by primary blower 125 and/or secondary blower 190 may be fulfilled instead by one or more air compressors and/or air generators.

Figure 2:
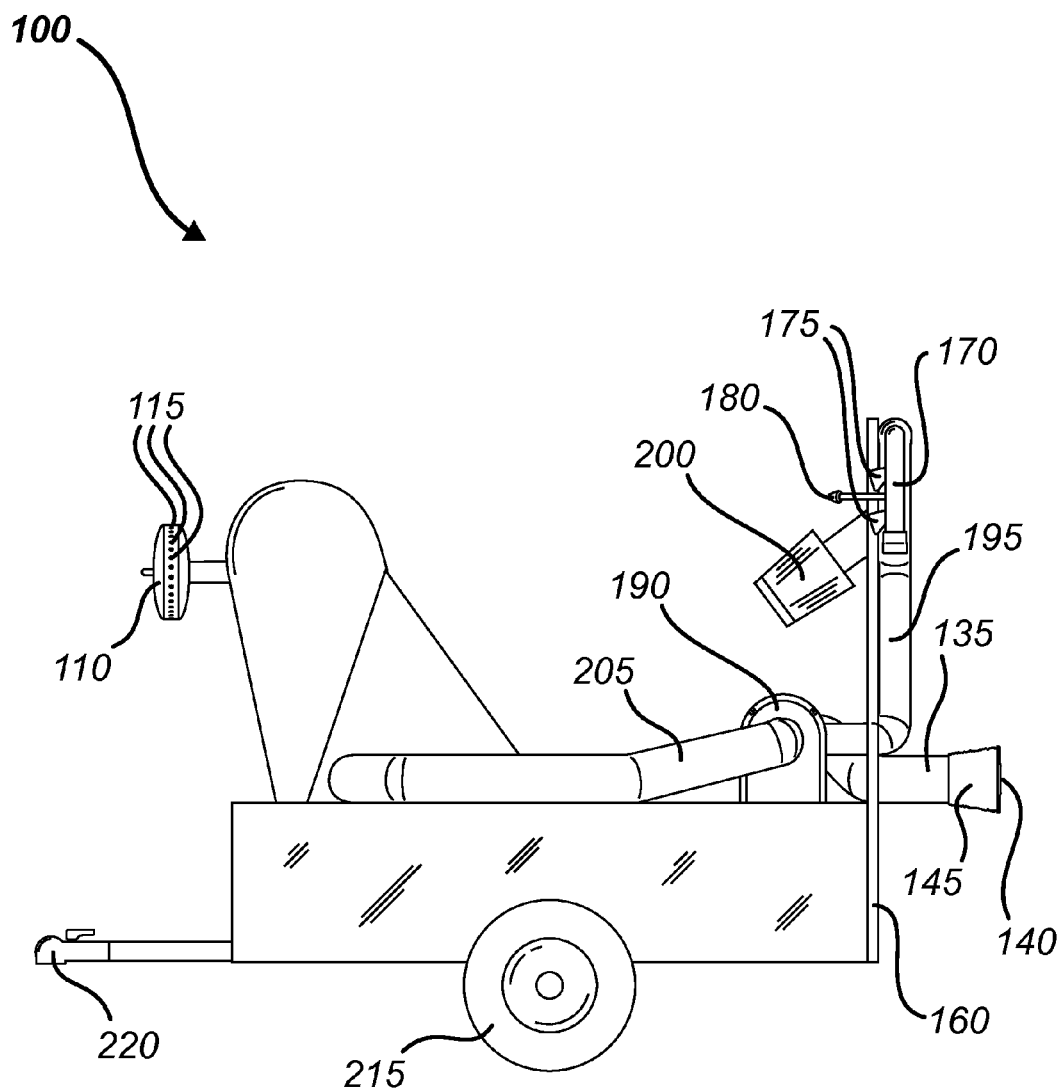
Figure 3:
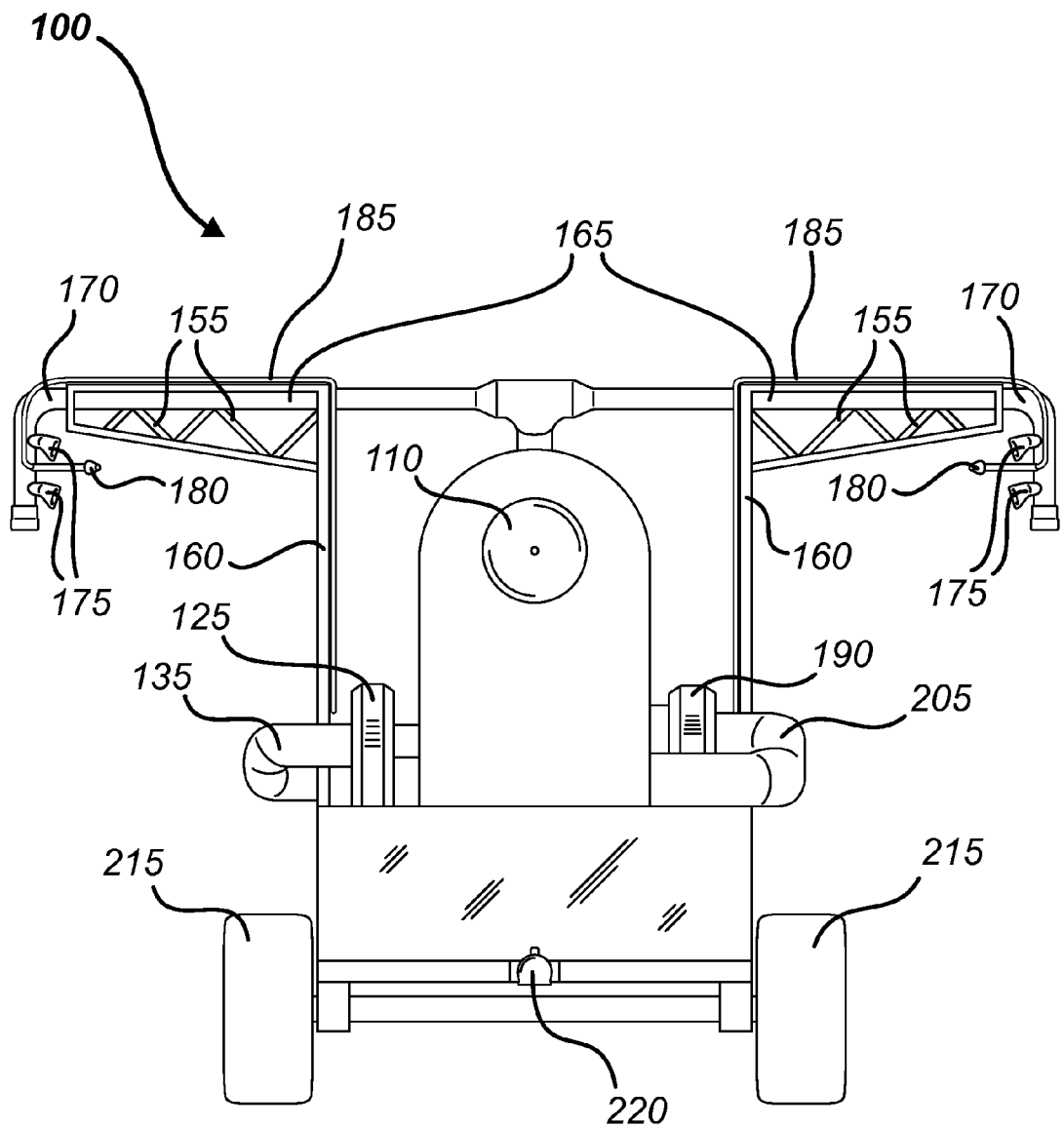

As depicted in FIGS. 1, 2, and 3, vehicle 100 comprises two wheels 215 on an axle. In alternative embodiments, vehicle 100 additionally comprises one or two steerable or non-steerable front wheels. Vehicle 100 may be motivated by towing via tow hitch 220. Alternatively, vehicle 100 comprises driven wheels and may thus be self-powered.

Figure 4:
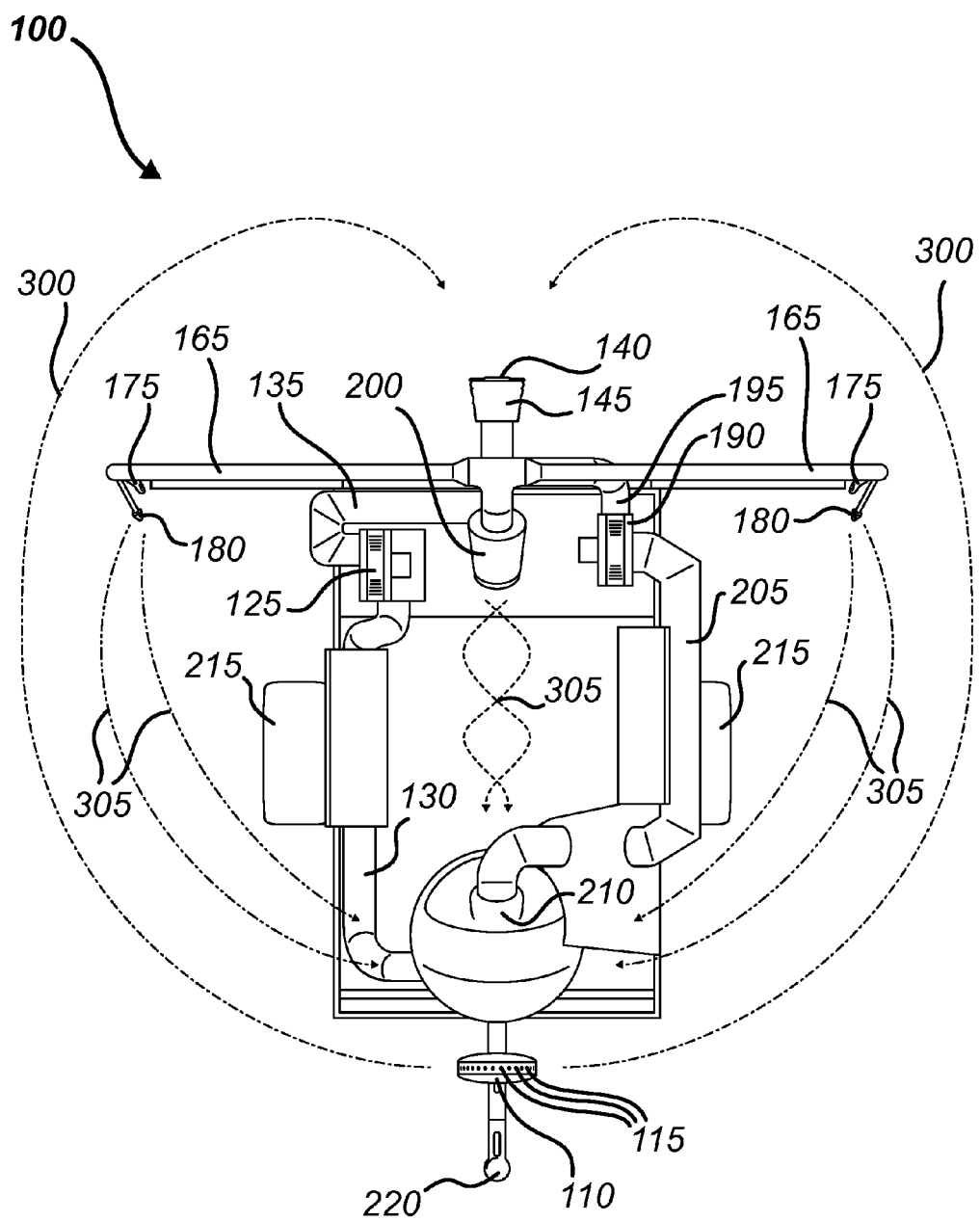

In operation, vehicle 100 is moved next to target objects 310 or one or two rows of target objects 310 where a spray application is intended. Referring now to FIG. 4, Primary blower 125 may be activated to create a primary air system 300. As a result, a first flow of air is ejected from air vents 115 and surrounds the vehicle 100, forming a field that may be shielded from ambient air. The primary air system 300 may prevent ingress of bulk ambient air as vehicle 100 moves forward or ambient winds blow around or at vehicle 100. Likewise, a substantially isolated field of circulating air may be maintained within the primary air system 300, so as to minimize or reduce the potential for air that is circulating within the target space to drift out of the field. The first flow of air of the primary air system 300 passes around the outside of the vehicle 100 and is drawn into primary air intake vent 140, before the first flow of air passes through primary blower 125 and is recirculated through air vents 115. Primary air system 300 may comprise laminar air flow around the field of recirculating air.

Secondary blower 190 may be activated to create a secondary air system 305. The secondary air system 305 comprises air circulating in the field encompassed within the primary air system 300. A chemical spray, an aerosol, particular matter, and/or other like substance may be entrained within the secondary air system 305. A secondary flow of air is ejected from secondary side vents 175 and secondary central vent 200 and circulated within the vicinity of vehicle 100 in the field surrounded by primary air system 300. Air ejected from secondary central vent 200 may experience cyclonic mixing and circulation as caused by vanes within secondary central vent 200. Air in the secondary air system 305 may be pulled into secondary intake vent 210 and pass through secondary blower inlet duct 205 to secondary blower 190 and be recirculated through secondary side vents 175 and secondary central vent 200. Secondary air system 305 may comprise turbulent air flow within the field and around target objects 310.

Spray nozzles 180 may emit a spray in liquid form, in aerosol form, as particulates entrained in a flow of air, or the like. Spray nozzles 180 may be adapted to emit an electrostatic spray. A pump may be activated to transmit the spray from a storage tank to spray nozzles 180 through spray hose 185. In one embodiment, liquid stored in tank is converted to aerosol by an atomizer installed at or near the tank or at spray nozzles 180. An aerosol may selectively be applied as spray if doing so might result in increased coverage on target objects 310 in comparison to liquid spray.

Spray may enter the secondary air system 305 and remain entrained therein as the air recirculates through the system. Alternate embodiments may not include spray nozzles 180 located at the secondary side vents 175, but rather emit spray elsewhere into the secondary air system 305. To apply a spray to a larger target object, volumetric air flows and air pressures may be increased to thereby increase the size of the field of recirculating air. Additionally, the size, direction, and number of air nose vents 115 may be altered to change the shape of the field of recirculating air.

Figure 5:
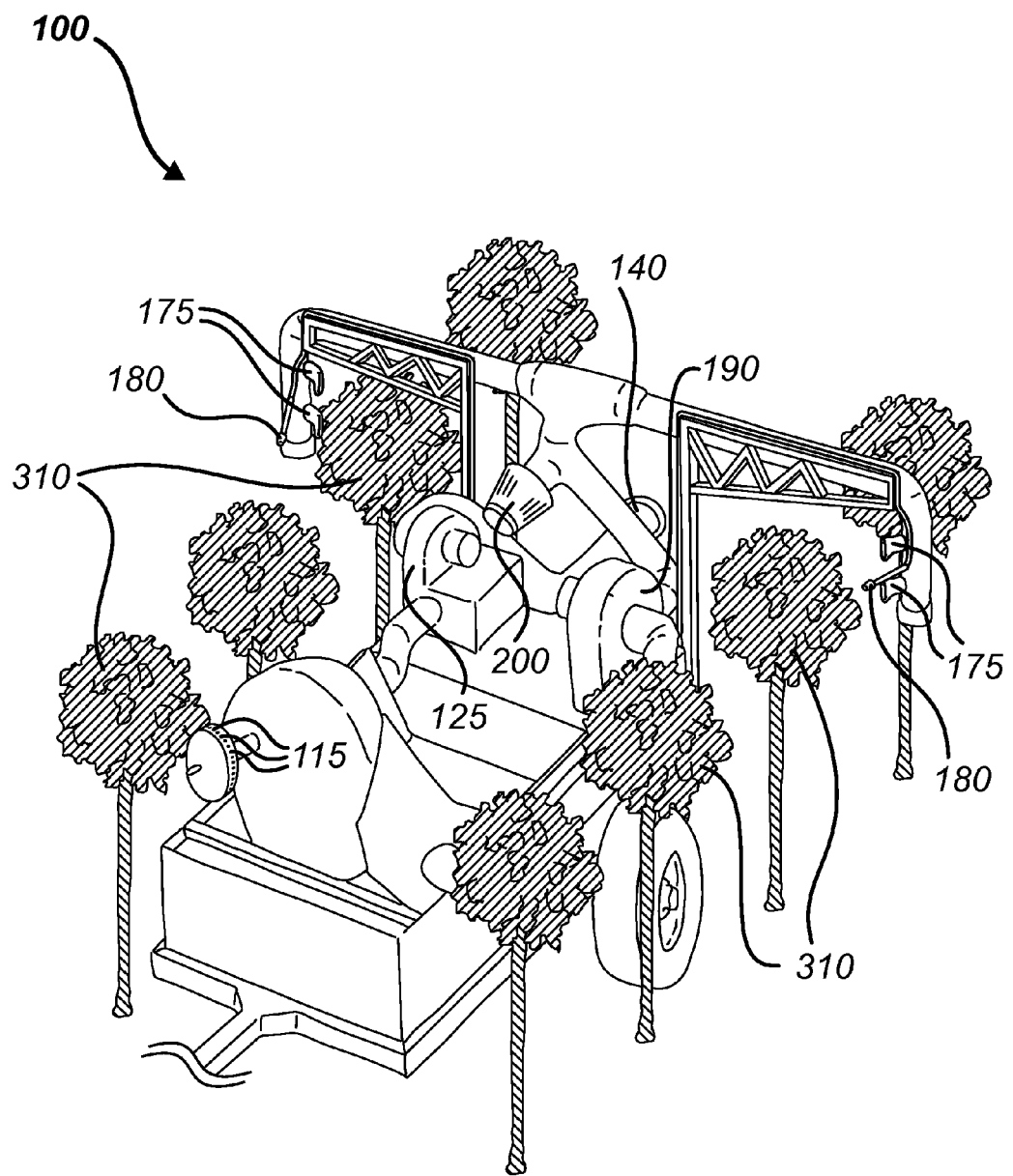

Referring now to FIG. 5, vehicle 100 may pass between rows of target objects 310 as primary blower 125 and secondary blower 190 create the primary air system 300 and secondary air system 305 (depicted in FIG. 4) and to thereby encompass the target objects 310 within the field of secondary air system 305. Sprays may include pesticides, nutrients, fungicides, herbicides, defoliants, and the like, as desired. Due to the recirculation of the secondary air system 305 and the turbulent nature thereof, the spray entrained therein may contact target objects 310 at multiple angles and therefore may cover multiple surfaces, so that, for example, coverage may occur on both the top and the bottom of leaves. The speed of the vehicle 100, whether towed by a tractor, other tow vehicle, or under self-power, may be typical of existing spray methods, which may typically be four to five miles per hour.

Alternative embodiments of the present disclosure may be utilized for spraying paint in automotive, aerospace, or like applications. Embodiments may be used for spraying de-icing spray in aerospace or like applications, spraying paint on road surfaces, or other applications wherein a spray may be applied to a target object.

In alternative embodiments of the present embodiment, vehicle 100 comprises curved skin surfaces at front and/or rear sections to improve laminar flow of primary air system 300 and to keep the primary air system 300 and secondary air system 305 from mixing with each other.

Systems and methods of the present disclosure may present numerous advantages over traditional spray technology and methods. Spray may be applied more precisely on target objects 310, so that fewer nozzles may be used. Spray may be ejected at lower pressure, using lower volumetric airflow, and with less chemicals emitted than traditional methods. The recaptured and recycled spray in the secondary air system 305 may result in less wasted chemicals, thereby resulting in less chemical released into the atmosphere and less overall cost.

Another advantage is that systems of the present disclosure may be employed in fields even with overhead obstacles such as power lines since there is no large spray recapture shell. Another advantage is that embodiments of the present disclosure may be used in environments experiencing relatively strong side winds because the primary air system 300 may isolate the field enclosed therein.

Although the present disclosure uses terms of certain embodiments, other embodiments will be apparent to those of ordinary skill in the art having the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An apparatus for spraying a target object, comprising:

a primary blower adapted to direct a first flow of air through a nose member, wherein the nose member comprises multiple radially-distributed air vents, wherein the radially-distributed air vents are adapted to direct the first flow of air in a first direction;

a primary air intake vent, wherein the primary air intake vent draws in at least a portion of the first flow of air, thereby creating a first flow field envelope extending from the primary blower to the primary air intake vent; and a secondary blower adapted to direct a second flow of air within the first flow field envelope created by the primary blower and the primary air intake vent.

2. The apparatus of claim 1, further comprising a vehicle, wherein the primary blower and the primary air intake vent are mounted on the vehicle such that the first flow field envelope encompasses at least a portion of the vehicle.

3. The apparatus of claim 2, wherein the first direction is approximately parallel to a forward direction of the vehicle.

4. The apparatus of claim 2, wherein the first direction is at an angle to a forward direction of the vehicle.

5. The apparatus of claim 1, further comprising a storage tank;

a spray nozzle, wherein the spray nozzle emits a spray into the second flow of air; and a spray hose.

6. The apparatus of claim 5, wherein the spray emitted by the spray nozzle is one or more sprays selected from the group consisting of a liquid, an aerosol, particulates entrained in a flow of air, and an electrostatic spray.

7. The apparatus of claim 1 further comprising:

a primary blower inlet duct, wherein the primary blower inlet duct includes the primary air intake vent and a vent filter; and an inlet port of the primary blower, wherein the primary blower inlet duct and the inlet port of the primary blower are attached.

8. The apparatus of claim 7, further comprising a dust recapture system, wherein the dust recapture system is located within the primary blower inlet duct.

9. An apparatus for creating a field that may be shielded from ambient air, comprising;

a nose member including air vents, wherein the air vents comprise pass-through holes in the nose member;

a primary blower, wherein the primary blower directs a first flow of air in a first direction through the air vents;

a primary air intake vent, wherein the primary air intake vent draws in at least a portion of the first flow of air, thereby creating a first flow field envelope extending from the primary blower to the primary air intake vent;

a secondary side vent;

a secondary central vent; and a secondary blower, wherein the secondary blower directs a second flow of air within the first flow field envelope created by the primary blower and the primary air intake vent.

10. The apparatus of claim 9, further comprising a secondary intake vent, wherein the secondary intake vent draws in the second flow of air, directing the second flow of air to a secondary inlet duct, wherein the secondary inlet duct directs the second flow of air to the secondary blower.

11. An apparatus for spraying a target object, comprising:

a nose member including air vents, wherein the air vents comprise pass-through holes in the nose member;

a primary blower, wherein the primary blower directs a first flow of air in a first direction through the air vents;

a primary air intake vent, wherein the primary air intake vent draws in at least a portion of the first flow of air, thereby creating a first flow field envelope extending from the primary blower to the primary air intake vent;

a secondary air pipe; and a secondary blower adapted to direct a second flow of air within the first flow field envelope created by the primary blower and the primary air intake vent.

12. The apparatus of claim 11, further comprising a secondary side vent attached on the secondary air pipe, wherein the secondary blower directs the second flow of air through the secondary side vent.

13. The apparatus of claim 11, further comprising a spray nozzle, wherein the spray nozzle is attached on the secondary air pipe and is connected to a spray hose.

14. The apparatus of claim 11, further comprising a secondary central vent, wherein the secondary blower directs the second flow of air through the secondary central vent.

15. The apparatus of claim 14, wherein the secondary central vent further comprises a large nozzle having internal vanes, wherein the internal vanes create cyclonic air movement on the second flow of air.

16. The apparatus of claim 14, wherein the secondary central vent is communicatively coupled with a secondary blower outlet duct.

17. The apparatus of claim 11, further comprising a secondary blower inlet duct communicatively coupled to a secondary air intake vent via an inlet port of secondary blower.

18. The apparatus of claim 11, further comprising an output port of the secondary blower;

a secondary blower outlet duct, wherein the secondary air pipe is communicatively coupled with the output port of the secondary blower via the secondary blower outlet duct.

* * * * *